United States Patent
Son

(12) 
(10) Patent No.: US 8,813,927 B2
(45) Date of Patent: Aug. 26, 2014

(54) HYDRAULIC PRESSURE CONTROL SYSTEM FOR TORQUE CONVERTER

(75) Inventor: Hyunjun Son, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 69 days.

(21) Appl. No.: 13/560,369

(22) Filed: Jul. 27, 2012

(65) Prior Publication Data

US 2013/0146156 A1  Jun. 13, 2013

(30) Foreign Application Priority Data

Dec. 9, 2011  (KR) ........................ 10-2011-0132256

(51) Int. Cl.
*F16H 61/14* (2006.01)
*F16H 45/02* (2006.01)

(52) U.S. Cl.
USPC ...................................... 192/3.29; 192/85.63

(58) Field of Classification Search
USPC ..................... 192/3.3, 3.29, 85.63
See application file for complete search history.

(56) References Cited

U.S. PATENT DOCUMENTS 6,662,918 B2 * 12/2003 Takeuchi et al. ............. 192/3.29
7,073,647 B2 *  7/2006 Morise et al. ................ 192/3.29

FOREIGN PATENT DOCUMENTS

| JP | 7-224914 A | 8/1995 |
|---|---|---|
| JP | 8-21524 A | 1/1996 |
| JP | 2924597 B2 | 5/1999 |
| JP | 2004-340308 A | 12/2004 |
| JP | 3791716 B2 | 4/2006 |
| JP | 2007-40374 A | 2/2007 |
| JP | 2011-106552 A | 6/2011 |

* cited by examiner

*Primary Examiner* — Troy Chambers
*Assistant Examiner* — Lillian Nguyen
(74) *Attorney, Agent, or Firm* — Morgan, Lewis & Bockius LLP

(57) ABSTRACT

A hydraulic pressure control system for a torque converter includes a lock-up clutch operated according to pressure difference between an engagement and disengagement side oil chambers, a first hydraulic line communicated with the disengagement side oil chamber, second and third hydraulic lines communicated with the engagement side oil chamber, and a lock-up switch valve and a torque converter hydraulic pressure control valve that generate pressure difference between the second and the third hydraulic line communicated so that fluid within the engagement side oil chamber is circulated in lock-up on state of the lock-up clutch, and the lock-up switch valve and the torque converter hydraulic pressure control valve generate pressure difference between the second and the third hydraulic line in slip state of the lock-up clutch higher than the pressure difference between the second and the third hydraulic line in the lock-up on state of the lock-up clutch.

4 Claims, 5 Drawing Sheets

HYDRAULIC PRESSURE CONTROL SYSTEM FOR TORQUE CONVERTER

CROSS-REFERENCE TO RELATED APPLICATION

The present application claims priority of Korean Patent Application Number 10-2011-0132256 filed Dec. 9, 2011, the entire contents of which application is incorporated herein for all purposes by this reference.

BACKGROUND OF INVENTION

1. Field of Invention

The present invention relates to a hydraulic pressure control system for a torque converter. More particularly, the present invention relates to a hydraulic pressure control system for a torque converter which may increase cooling efficiency by circulating fluid even in operation of a lock up clutch.

2. Description of Related Art

A general torque converter is provided with a lock-up clutch which may transfer torque mechanically.

The lock-up clutch is disposed between a cover (a front cover) which is an input rotary member and a turbine which is an output rotary member.

A space between the front cover and the turbine may be divided into a disengagement side oil chamber and an engagement side oil chamber.

The lock-up clutch is controlled to operate or not according to hydraulic pressure difference between the disengagement side oil chamber and the engagement side oil chamber.

In detail, if a fluid within the disengagement side oil chamber is drained and a fluid is supplied to the engagement side oil chamber, the hydraulic pressure difference between the engagement side oil chamber and the disengagement side oil chamber may allow a friction member of the lock-up clutch is frictionally engaged with to the front cover.

That is, frictional engaging force of the lock-up clutch is increased and then complete frictional engagement of the lock-up clutch is realized. That means lock-up on state of the lock-up clutch is realized.

If a fluid is supplied to the disengagement side oil chamber so that the hydraulic pressure difference between the engagement side oil chamber and the disengagement side oil chamber is reduced, the lock-up clutch is in state of slip.

If the slip of the lock-up clutch is repeated, frictional heat due to the slip is increased, so that durability of the friction members may be deteriorated.

The above information disclosed in this Background section is only for enhancement of understanding of the background of the invention and therefore it may contain information that does not form the prior art that is already known in this country to a person of ordinary skill in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a hydraulic pressure control system for a torque converter which may increase cooling efficiency by circulating fluid even in operation of a lock up clutch, suppress frictional heat due to the slip, and enhance durability of the friction members.

Various aspects of the present invention provide for a hydraulic pressure control system for a torque converter including a lock-up clutch that is operated according to pressure difference between an engagement side oil chamber and a disengagement side oil chamber, wherein the control system may include a first hydraulic line communicated with the disengagement side oil chamber, and a second and a third hydraulic line communicated with the engagement side oil chamber, and a lock-up switch valve and a torque converter hydraulic pressure control valve which are communicated with the first, second, and third hydraulic line respectively, wherein the lock-up switch valve and the torque converter hydraulic pressure control valve generate pressure difference between the second and the third hydraulic line communicated with the engagement side oil chamber respectively so that fluid within the engagement side oil chamber to be circulated in lock-up on state of the lock-up clutch, and the lock-up switch valve and the torque converter hydraulic pressure control valve generate pressure difference between the second and the third hydraulic line in slip state of the lock-up clutch higher than the pressure difference between the second and the third hydraulic line in the lock-up on state of the lock-up clutch so that fluid within the engagement side oil chamber to be circulated.

The lock-up switch valve may be a spool valve which is able to converse hydraulic line according to movement of a valve spool by control pressure of an on/off solenoid valve, and the torque converter hydraulic pressure control valve may be a spool valve which is able to control exhausted hydraulic pressure though the lock-up switch valve according to movement of a spool valve by control pressure of a proportional control solenoid valve.

The lock-up switch valve may include a plurality of ports connecting the first hydraulic line communicated with the disengagement side oil chamber and the torque converter hydraulic pressure control valve, supplying drive pressure of a regulator valve to the second hydraulic line, and connecting the third hydraulic line communicated with the engagement side oil chamber and the torque converter hydraulic pressure control valve respectively.

A valve body of the lock-up switch valve may include a first port of which the control pressure of the on/off solenoid valve is supplied thereto, a second port of which the drive pressure of the regulator valve is supplied thereto, a third port selectively supplying hydraulic pressure supplied to the second port to a cooler, a fourth port connected with the third hydraulic line, a fifth port selectively communicated with the fourth port, a sixth port of which the drive pressure of the regulator valve is supplied thereto, a seventh port connected with the second hydraulic line, an eighth port of which the drive pressure of the regulator valve is supplied thereto, a ninth port connected with the first hydraulic line, and a tenth port selectively communicated with the ninth port.

The torque converter hydraulic pressure control valve may be able to exhaust the hydraulic pressure exhausted from the lock-up switch valve through two exit ports.

A valve body of the torque converter hydraulic pressure control valve may include a first port of which the drive pressure of the regulator valve is supplied thereto, a second port communicated with the tenth port of the lock-up switch valve, a third port communicated with the fifth port of the lock-up switch valve, a fourth port communicated with the tenth port of the lock-up switch valve together with the second port, a fifth port of which the control pressure of the proportional control solenoid valve is supplied thereto, a first exhaust port exhausting hydraulic pressure supplied to the first port and leaked therefrom, a second exhaust port selectively communicated with the second port, a third exhaust port selectively communicated with the third port, and a fourth exhaust port selectively communicated with the third port.

The third exhaust port and the fourth exhaust port may be provided with an orifice respectively.

A cross section of the orifice disposed to the third exhaust port may be smaller than a cross section of the orifice disposed to the fourth exhaust port.

The third exhaust port may be communicated with a high pressure hydraulic line which is able to supply high pressure thereto.

The high pressure hydraulic line may be supplied with the line pressure.

The torque converter hydraulic pressure control valve may be able to exhaust the hydraulic pressure exhausted from the lock-up switch valve through two exit ports.

The lock-up switch valve and the torque converter hydraulic pressure control valve may generate pressure difference between the second and the third hydraulic line communicated with the engagement side oil chamber respectively so that fluid within the engagement side oil chamber to be circulated in lock-up on state of the lock-up clutch, and the lock-up switch valve and the torque converter hydraulic pressure control valve may generate pressure difference between the second and the third hydraulic line in slip state of the lock-up clutch higher than the pressure difference between the second and the third hydraulic line in the lock-up on state of the lock-up clutch so that fluid within the engagement side oil chamber to be circulated.

By circulating fluid in operation of the lock up clutch and in slip state of the lock up clutch, frictional heat due to the slip may be suppressed, and durability of the friction members may be enhanced.

Also, due to the circulation of the fluid, the operation control of the lock-up clutch may be performed easily.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
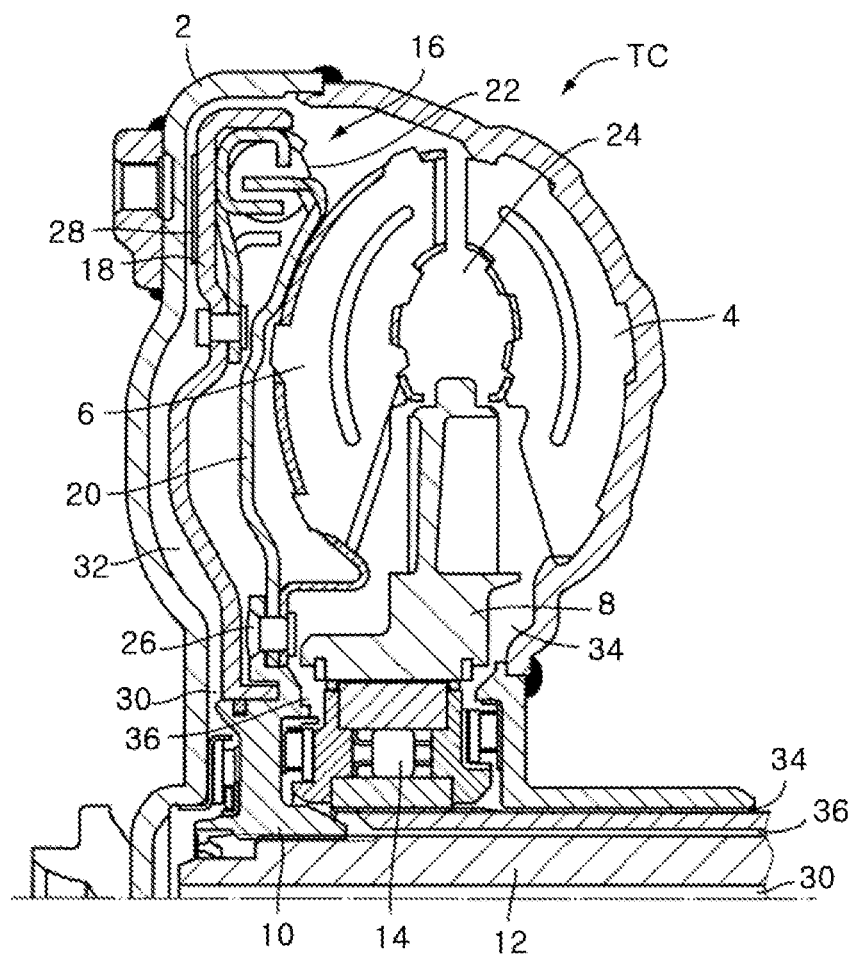
FIG. 1 is a cross-sectional view of an exemplary torque converter including a hydraulic pressure control system for a torque converter according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present invention will be omitted, and the same constituent elements are denoted by the same reference numerals in this specification.

In addition, size and thickness of components shown in the drawings may be differ from real size and real thickness of the components for better comprehension and ease of description. Therefore, the present invention is not limited to those shown in the drawings.

Referring to FIG. 1, a torque converter TC includes a front cover 2, an impeller 4, a turbine 6 and a stator 8.

The front cover 2 is connected with a crankshaft of an engine and rotates with the engine.

The impeller 4 is connected with the front cover 2 and rotates together with.

The turbine 6 is disposed faced up the impeller 4, is rotated by fluid supplied from the impeller 4, and drives an input shaft 12 of a transmission through a turbine hub 10.

The stator 8 is disposed between the impeller 4 and the turbine 6, rotates only one direction by means of a one-way clutch 14, and turns the fluid flow from the turbine 6 to the impeller 4.

A rotation center of the stator 8 is identical to that of the front cover 2, and a lock-up clutch 16 which may engage the engine and the transmission is disposed between the front cover 2 and the turbine 6.

The lock-up clutch 16 includes a clutch piston 18, a damper 20, and a coil spring 22.

The clutch piston 18 is disposed between the turbine 6 and the front cover 2 movable toward or backward of the front cover 2.

A space between the clutch piston 18 and the impeller 4 is formed and an engagement side oil chamber 24.

The damper 20 is disposed between the clutch piston 18 and the turbine 6, connected with the turbine 6 and the turbine hub 10 by a rivet 26, and rotates with the input shaft 12 and the turbine hub 10.

The coil spring 22 is disposed between external circumferences of the clutch piston 18 and the damper 20 and allows relative rotation between the clutch piston 18 and the damper 20.

A friction member 28 is fixed to a surface of the clutch piston 18 faced up with the front cover 2.

A first hydraulic line 30 is formed between the front cover 2 and the turbine hub 10, and the first hydraulic line 30 is communicated with a disengagement side oil chamber 32 formed between the front cover 2 and the clutch piston 18.

A second hydraulic line 34 is formed between the impeller 4 and the stator 8, and a third hydraulic line 36 is formed between the turbine hub 10 and the stator 8.

The second hydraulic line 34 and the third hydraulic line 36 are communicated with the engagement side oil chamber 24.

In the torque converter TC, the lock-up clutch 16 may be frictionally engaged with the front cover 2 due to pressure difference between hydraulic pressure of the engagement side oil chamber 24 and hydraulic pressure of the disengagement side oil chamber 32, and the impeller 4 and the turbine 6 rotate integrally by complete engagement.

And slip amount may be controlled by feedback control of engagement torque at a predetermined slip state.

A hydraulic pressure control circuit for controlling the lock-up clutch 16 will be described in further detail below.

Figure 2:
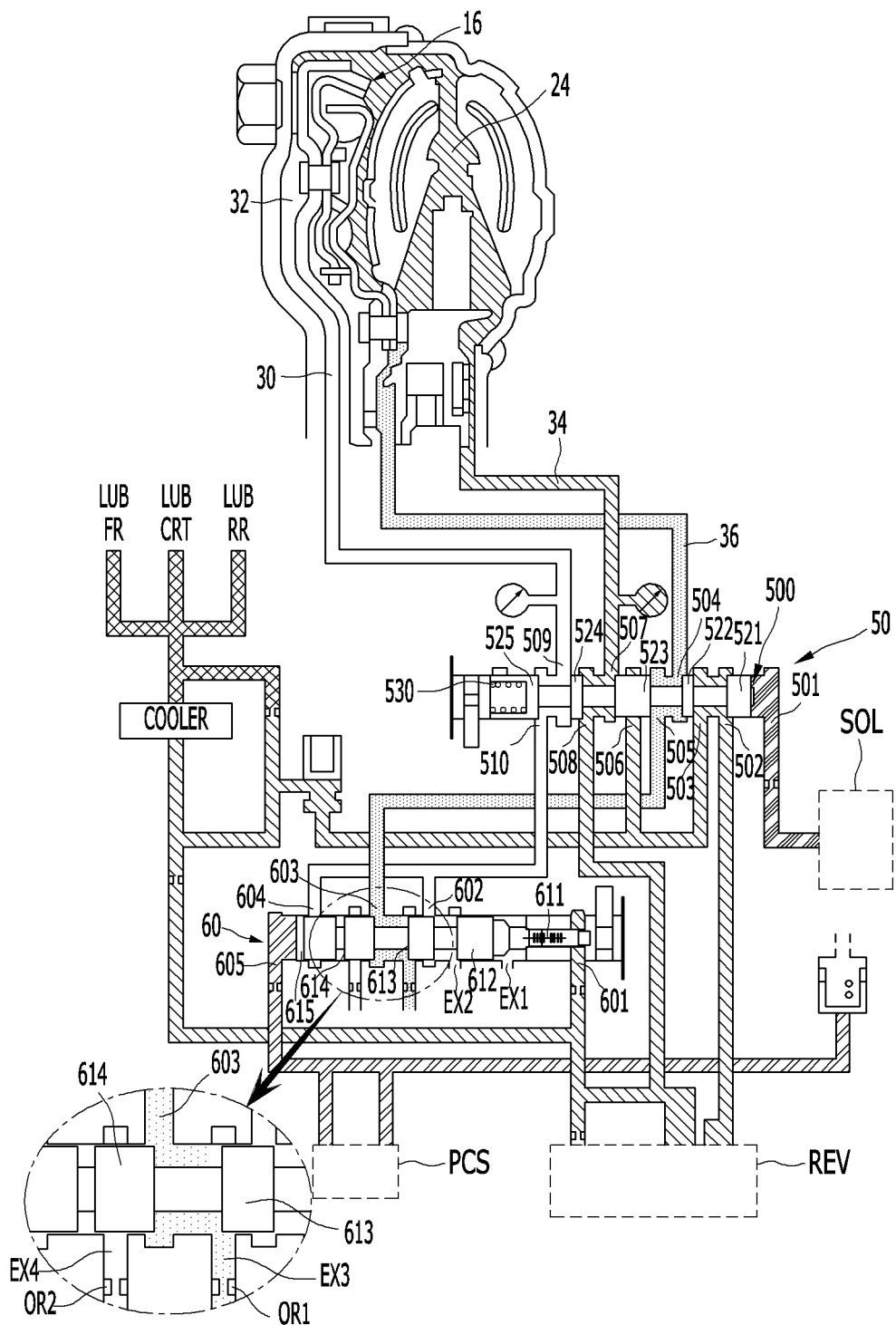
FIG. 2 is a drawing showing an exemplary torque converter including a hydraulic pressure control system for a torque converter according to the present invention in lock-up on state.
Figure 3:
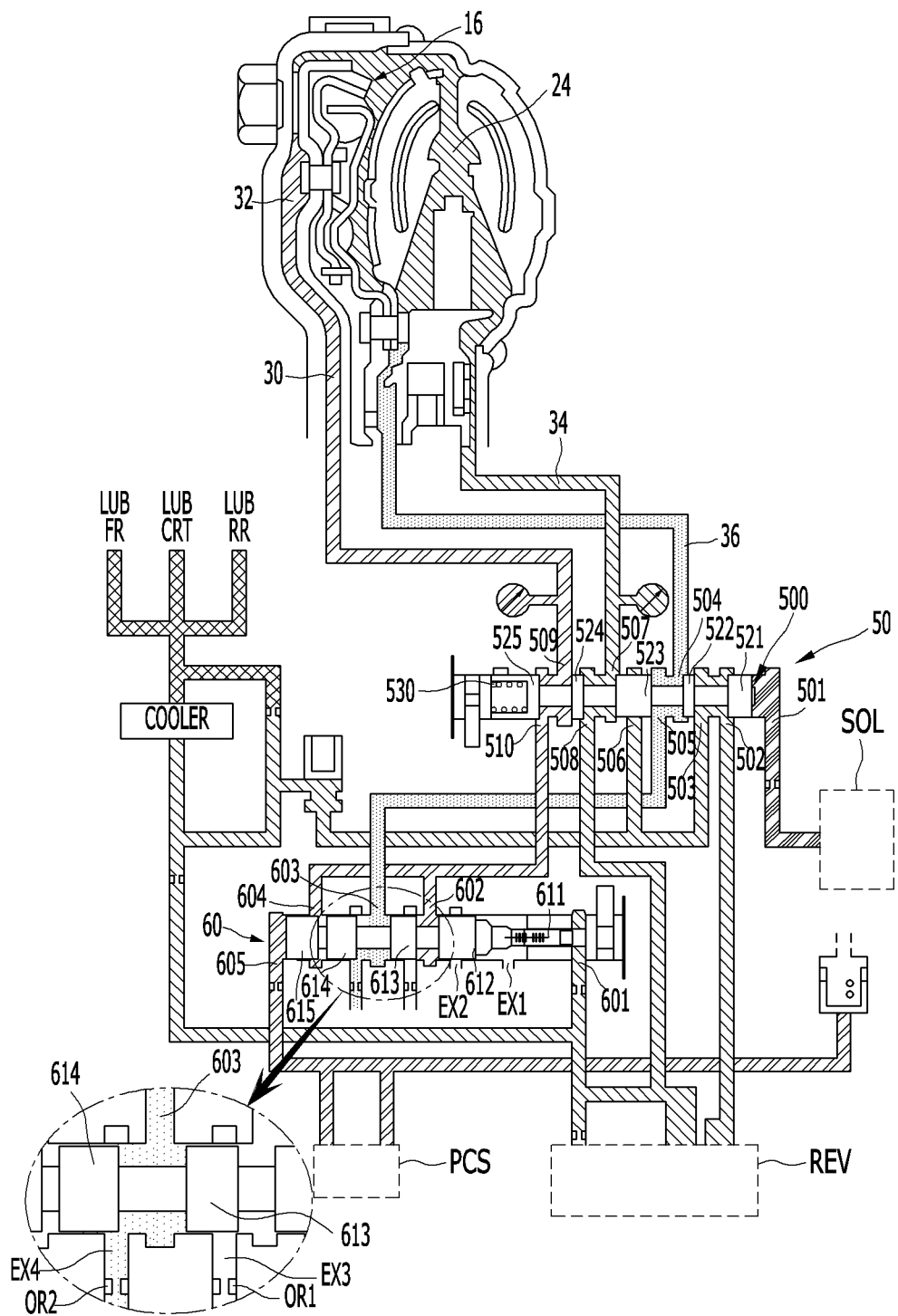
FIG. 3 is a drawing showing an exemplary torque converter including a hydraulic pressure control system for a torque converter according to the present invention in slip state.

FIG. 2 is a drawing showing a torque converter of which a hydraulic pressure control system for a torque converter according to various embodiments of the present invention in lock-up on state, and FIG. 3 is a drawing showing a torque converter of which a hydraulic pressure control system for a torque converter according to various embodiments of the present invention in slip state.

Referring to FIG. 2 and FIG. 3, hydraulic pressure supplied to or exhausted from the torque converter TC is controlled by a lock-up switch valve 50 and a torque converter pressure control valve 60.

The lock-up switch valve 50 is a spool valve which is able to converse hydraulic line according to movement of a valve spool by control pressure of an on/off solenoid valve.

For this purpose, a valve body of the lock-up switch valve 50 includes a first-a tenth port 501-510 and a valve spool 500 includes a first-a fifth land 510-515 and one elastic member 530.

The first port 501 is formed for the control pressure of the on/off solenoid valve to be supplied thereto.

The second port 502 is formed for drive pressure of a regulator valve is supplied thereto.

The third port 503 is formed for selectively supplying hydraulic pressure supplied to the second port 502 to a cooler.

The fourth port 504 is connected with the third hydraulic line 36.

The fifth port 505 is selectively communicated with the fourth port 504.

The sixth port 506 is formed for the drive pressure of the regulator valve is supplied thereto.

The seventh port 507 is connected with the second hydraulic line 34.

The eighth port 508 is formed for the drive pressure of the regulator valve is supplied thereto.

The ninth port 509 is connected with the first hydraulic line 30.

The tenth port 510 is selectively communicated with the ninth port 509.

The first land 521 is applied with control pressure supplied to the first port 501.

The second land 522, together with the first land 521, selectively communicates the second port 502 with the third port 503.

The third land 523, together with the second land 522, selectively communicates the fourth port 504 with the third port 503 or the fifth port 505.

The fourth land 524, together with the third land 523, selectively communicates the seventh port 507 with the sixth port 506 or the eighth port 508.

The fifth land 525, together with the fourth land 524, selectively communicates the ninth port 509 with the tenth port 510.

The elastic member 530, as a compress coil spring, is disposed between the fifth land 525 and the valve body and biases the valve spool 500 to the first port 501.

If the control pressure is supplied to the first port 501, the valve spool 500 moves to the left in the drawing.

The second port 502 is communicated with the third port 503, the fourth port 504 is communicated with the fifth port 504, the seventh port 507 is communicated with the eighth port 508, and the ninth port 509 is communicated with the tenth port 510.

On the contrary, if the control pressure supplied to the first port 501 is cut off, the valve spool 500 is moved to the right in the drawing by biasing force of the elastic member 530.

Then the fourth port 504 is communicated with the third port 503, the seventh port 507 is communicated with the sixth port 506, and the ninth port 509 is communicated with the eighth port 508.

The drive pressure supplied from the regulator valve means a pressure that is regulated at the regulator valve for the hydraulic control system of the automatic transmission.

The torque converter hydraulic pressure control valve 60 is a spool valve which is able to control exhausted hydraulic pressure from the torque converter TC according to movement of a spool valve by control pressure of a proportional control solenoid valve.

For this purpose, a valve body of the torque converter hydraulic pressure control valve 60 includes a first-a fifth port 601-605, and a first-a fourth exhaust port EX1-EX4, and the valve spool 600 includes a first-a fifth land 611-615.

The first port 601 is formed for the drive pressure of the regulator valve to be supplied thereto.

The second port 602 is communicated with the tenth port 510 of the lock-up switch valve 50.

The third port 603 is communicated with the fifth port 505 of lock-up switch valve 50.

The fourth port 604, together with the second port 602, is communicated with the tenth port 510 of the lock-up switch valve 50.

The fifth port 605 is formed for the control pressure of the proportional control solenoid valve to be supplied thereto.

The first exhaust port EX1 is formed near the first port 601 and exhausts leaked hydraulic pressure supplied to the first port 601.

The second exhaust port EX2 is selectively communicated with the second port 602.

The third exhaust port EX3 is selectively communicated with the third port 603, and the fourth exhaust port EX4 is selectively communicated with the third port 603.

The control pressure supplied to the first port 601 is applied to the first land 611, and the second land 612 selectively opens or closes the second exhaust port EX2.

The third land 613, together with the second land 612, selectively communicates the second port 602 with the second exhaust port EX2.

The fourth land 614, together with the third land 623, selectively communicates the third port 603 with the third exhaust port EX3 or the fourth exhaust port EX4, and the fifth land 615 is applied with the control pressure supplied to the fifth port 605.

If the sixth port 605 is supplied with the control pressure of the proportional control solenoid valve, and the valve spool 600 moves to the right in the drawing according to the hydraulic pressure supplied thereto.

Then the second port 602 is communicated with the second exhaust port EX2 and the third port 603 is communicated with the third exhaust port EX3.

On the contrary, if the control pressure supplied to the fifth port 605 is reduced, the valve spool 600 moves to the left in the drawing due to the control pressure supplied to the first port 601.

Then the second exhaust port EX2 is closed by the second land 612, and the third port 603 is communicated with the fourth exhaust port EX4.

That is, the torque converter hydraulic pressure control valve 60 controls hydraulic pressure exhaust of the third hydraulic line 36 according to difference between the control pressure supplied to the first port 601 and the control pressure supplied to the fifth port 605.

At a state of lock-up on of the lock-up clutch 16, as shown in FIG. 2, high hydraulic pressure is supplied to the engagement side oil chamber 24 through the second hydraulic line 34, and the hydraulic pressure of the third hydraulic line 36 is slowly exhausted through the third exhaust port EX3 of the torque converter hydraulic pressure control valve 60, and thus the fluid within the torque converter TC circulates.

The circulation of the fluid within the torque converter TC at the lock-up on state may allow cooling of the torque converter TC so cooling efficiency may be enhanced.

At a slip state of the lock-up clutch 16, as shown in FIG. 3, the high hydraulic pressure is supplied to the engagement side oil chamber 24 through the second hydraulic line 34, and the hydraulic pressure of the third hydraulic line 36 is slowly exhausted through the fourth exhaust port EX4 of the torque converter hydraulic pressure control valve 60, and thus the fluid within the torque converter TC circulates.

In this case, the third and fourth exhaust port EX3 and EX4 is provided with a first and a second orifice OR1 and OR2 respectively.

A cross section of the first orifice OR1 is formed relatively small (for example, 0.8 mm in diameters) so that loss of flux at the lock-up on state may be minimized. And a cross section of the second orifice OR2 is formed relatively large (for example, 1.5 mm in diameters) so that circulation of the third hydraulic line 36 may be increased.

That is, the cross section of the first orifice OR1 is smaller than the cross section of the second orifice OR2.

Thus, the circulation of the torque converter TC at the slip state is faster than the circulation of the torque converter TC at the lock-up on state for improving cooling efficiency, and thus frictional heat due to the slip may be suppressed, and durability of the friction members may be enhanced.

Figure 4:
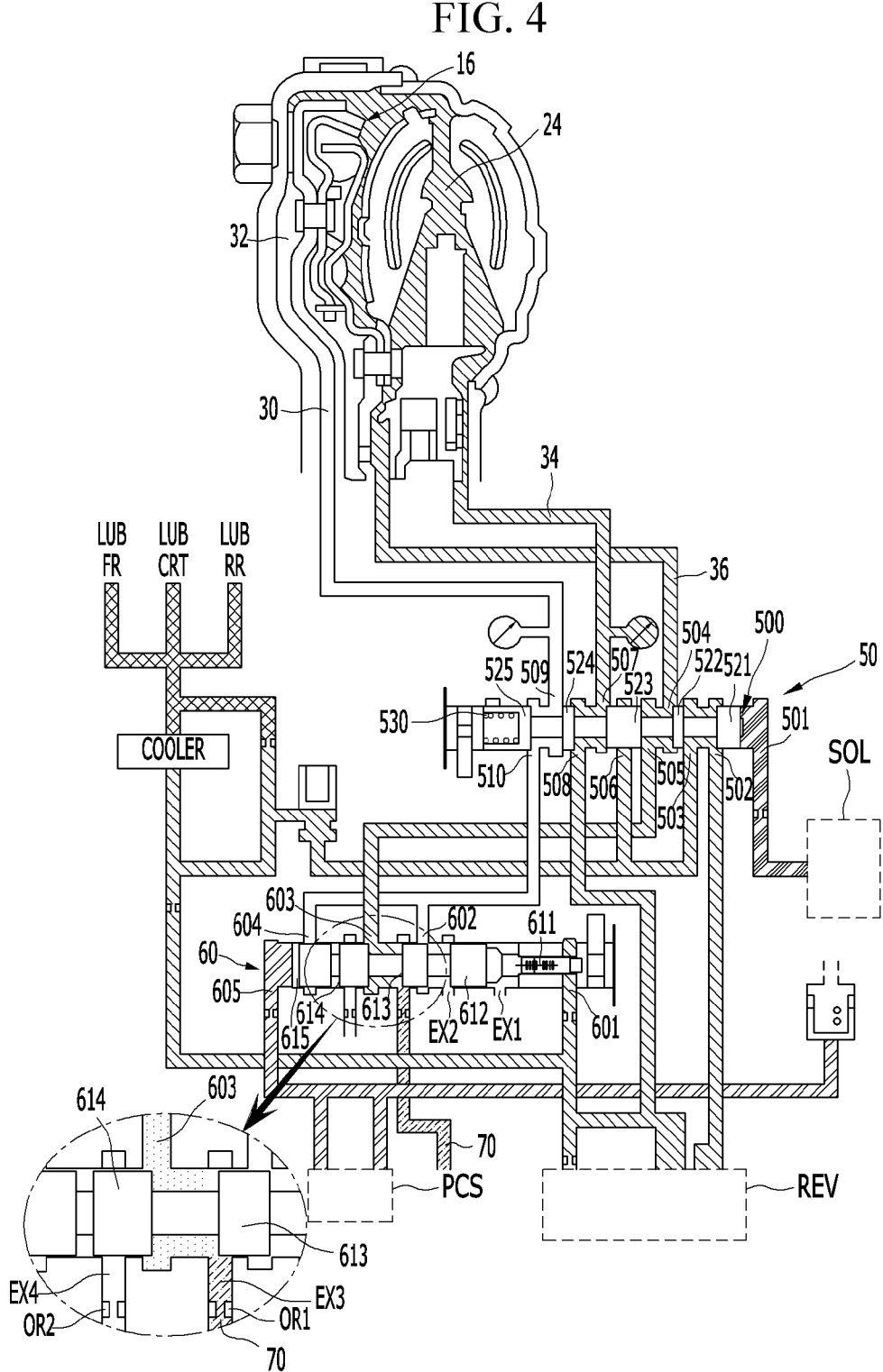
FIG. 4 is a drawing showing an exemplary torque converter including a hydraulic pressure control system for a torque converter according to the present invention in lock-up on state.
Figure 5:
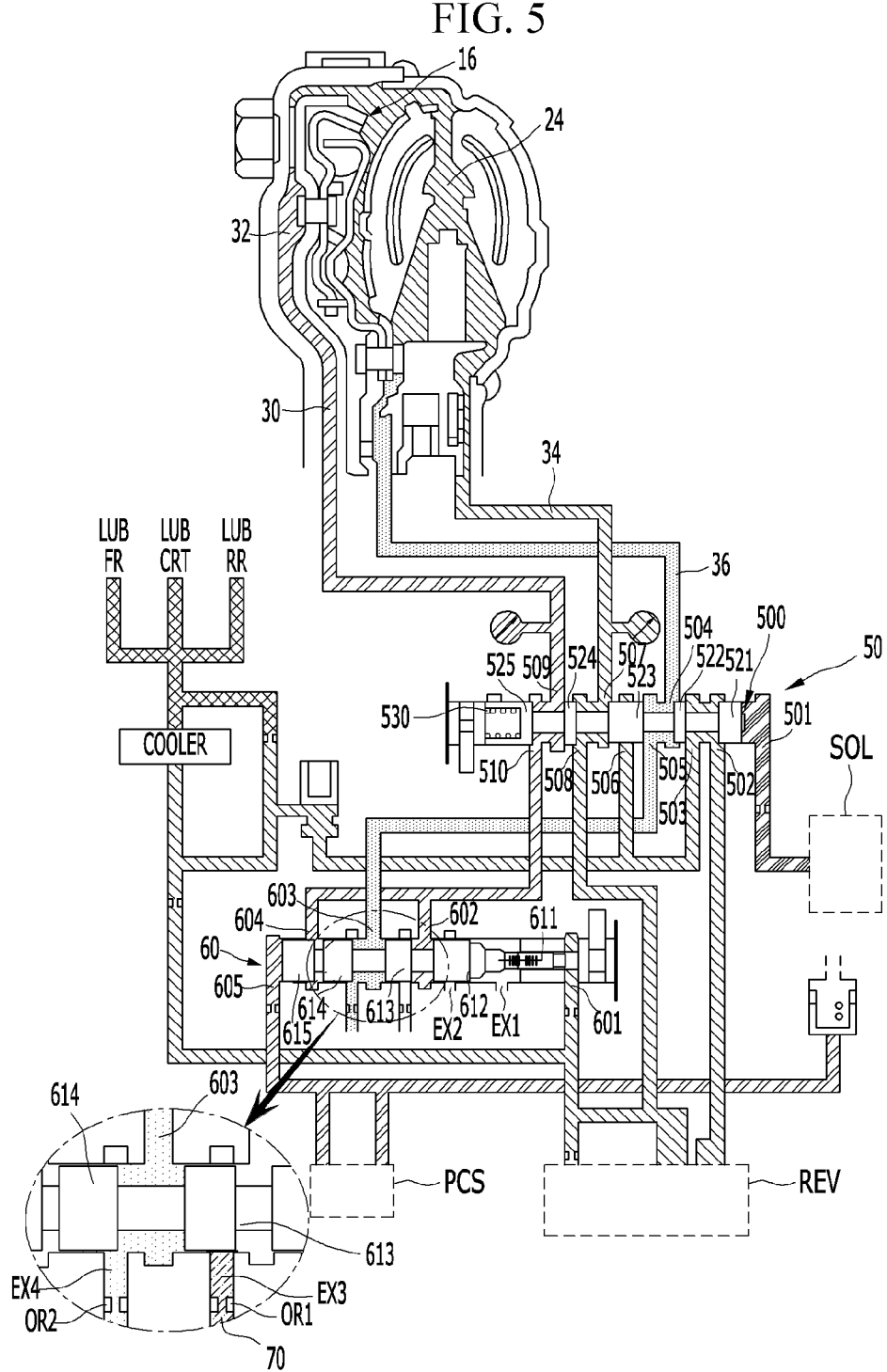
FIG. 5 is a drawing showing an exemplary torque converter including a hydraulic pressure control system for a torque converter according to the present invention in slip state.

FIG. 4 is a drawing showing a torque converter of which a hydraulic pressure control system for a torque converter according to various embodiments of the present invention in lock-up on state, and FIG. 5 is a drawing showing a torque converter of which a hydraulic pressure control system for a torque converter according to various embodiments of the present invention in slip state.

Referring to FIG. 4 and FIG. 5, a hydraulic pressure control system according to various embodiments of the present invention is identical to the hydraulic pressure control system described above except that the third exhaust port EX3 of the torque converter hydraulic pressure control valve 60 is connected with a high pressure hydraulic line 70.

Except that the connection of the third exhaust port EX3 with the high pressure hydraulic line 70, and thus repeated description will be omitted.

The high pressure hydraulic line 70 may be a line pressure line for example, and at a lock-up on state as shown in FIG. 4, the engagement side oil chamber 24 of the torque converter TC is supplied with the high hydraulic pressure through the second and third hydraulic line 34 and 36, and thus the operation of the lock-up clutch 16 may be secured confirm.

In this case, if the hydraulic pressure the third hydraulic line 36 is increased due to the hydraulic pressure of the second hydraulic line 34 excessively, the torque converter TC may be damaged, and thus the size of the first orifice OR1 must be determined carefully.

The slip state according to various embodiments of the present invention is identical to the slip state according to that described above, and thus as shown in FIG. 5 and FIG. 3, the fluid within the torque converter TC circulates.

Thus, the circulation of the torque converter TC at the slip state is faster than the circulation of the torque converter TC at the lock-up on state for improving cooling efficiency, and thus frictional heat due to the slip may be suppressed, and durability of the friction members may be enhanced.

At a state of lock-up on of the lock-up clutch 16, as shown in FIG. 2, high hydraulic pressure is supplied to the engagement side oil chamber 24 through the second hydraulic line 34, and the hydraulic pressure of the third hydraulic line 36 is slowly exhausted through the third exhaust port EX3 of the torque converter hydraulic pressure control valve 60, and thus the fluid within the torque converter TC circulates.

By circulating fluid in operation of the lock up clutch and in slip state of the lock up clutch, frictional heat due to the slip may be suppressed, and durability of the friction members may be enhanced.

Also, due to the circulation of the fluid, the operation control of the lock-up clutch may be performed easily.

For convenience in explanation and accurate definition in the appended claims, the terms front, left or right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure control system for a torque converter including a lock-up clutch operated according to pressure difference between an engagement side oil chamber and a disengagement side oil chamber, the control system comprising:
   a first hydraulic line communicating with the disengagement side oil chamber, and second and third hydraulic lines communicating with the engagement side oil chamber; and
   a lock-up switch valve and a torque converter hydraulic pressure control valve which fluidly communicate with the first, second, and third hydraulic line,
   wherein the lock-up switch valve and the torque converter hydraulic pressure control valve communicating with the first, second, and third hydraulic lines generate pressure difference between the second line and the third hydraulic line which respectively communicate with the engagement side oil chamber so that fluid within the engagement side oil chamber is circulated in lock-up on state of the lock-up clutch, and
   the lock-up switch valve and the torque converter hydraulic pressure control valve generate pressure difference between the second hydraulic line and the third hydraulic line in slip state of the lock-up clutch higher than the pressure difference between the second hydraulic line and the third hydraulic line in the lock-up on state of the lock-up clutch so that fluid within the engagement side oil chamber is circulated;

wherein the lock-up switch valve is a spool valve which is able to communicate hydraulic lines according to movement of a valve spool of the lock-up switch valve by control pressure of an on/off solenoid valve;

wherein the torque converter hydraulic pressure control valve is a spool valve which is able to control exhausted hydraulic pressure through the lock-up switch valve according to movement of a spool valve of the hydraulic pressure control valve by control pressure of a proportional control solenoid valve;

wherein the lock-up switch valve comprises a plurality of ports connecting the first hydraulic line communicating with the disengagement side oil chamber and the torque converter hydraulic pressure control valve, supplying drive pressure of a regulator valve to the second hydraulic line, and connecting the third hydraulic line communicating with the engagement side oil chamber and the torque converter hydraulic pressure control valve respectively;

wherein a valve body of the lock-up switch valve comprises:
  a first port of which the control pressure of the on/off solenoid valve is supplied thereto;
  a second port of which the drive pressure of the regulator valve is supplied thereto;
  a third port selectively supplying hydraulic pressure supplied to the second port to a cooler;
  a fourth port connected with the third hydraulic line;
  a fifth port selectively communicating with the fourth port;
  a sixth port of which the drive pressure of the regulator valve is supplied thereto;
  a seventh port connected with the second hydraulic line;
  an eighth port of which the drive pressure of the regulator valve is supplied thereto;
  a ninth port connected with the first hydraulic line; and
  a tenth port selectively communicating with the ninth port, wherein the torque converter hydraulic pressure control valve is able to exhaust the hydraulic pressure exhausted from the lock-up switch valve through two exit ports, wherein a valve body of the torque converter hydraulic pressure control valve comprises:
a first port of which the drive pressure of the regulator valve is supplied thereto;
  a second port communicating with the tenth port of the lock-up switch valve;
  a third port communicating with the fifth port of the lock-up switch valve;
  a fourth port communicating with the tenth port of the lock-up switch valve together with the second port;
  a fifth port of which the control pressure of the proportional control solenoid valve is supplied thereto;
  a first exhaust port exhausting hydraulic pressure supplied to the first port and leaked therefrom;
  a second exhaust port selectively communicating with the second port;
  a third exhaust port selectively communicating with the third port; and
  a fourth exhaust port selectively communicating with the third port, wherein the third exhaust port and the fourth exhaust port are provided with an orifice respectively, and wherein a cross section of the orifice disposed to the third exhaust port is smaller than a cross section of the orifice disposed to the fourth exhaust port.

2. The hydraulic pressure control system of claim 1, wherein the third exhaust port is communicating with a high pressure hydraulic line which is able to supply high pressure thereto.

3. The hydraulic pressure control system of claim 2, wherein the high pressure hydraulic line is supplied with the line pressure.

4. The hydraulic pressure control system of claim 1, wherein the torque converter hydraulic pressure control valve is able to exhaust the hydraulic pressure exhausted from the lock-up switch valve through two exit ports.

* * * * *